(12) United States Patent
Wilson

(10) Patent No.: US 7,169,467 B2
(45) Date of Patent: *Jan. 30, 2007

(54) STRUCTURAL FOAM COMPOSITE HAVING NANO-PARTICLE REINFORCEMENT AND METHOD OF MAKING THE SAME

(75) Inventor: Phillip S Wilson, Hillsboro, OH (US)

(73) Assignee: Magna International of America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,290

(22) Filed: Jul. 29, 2004

(65) Prior Publication Data

US 2005/0048276 A1  Mar. 3, 2005

Related U.S. Application Data

(63) Continuation-in-part of application No. 09/868,857, filed on Jun. 21, 2001, now abandoned.

(51) Int. Cl.
*B32B 5/22* (2006.01)

(52) U.S. Cl. .................. 428/317.9; 521/83; 521/91

(58) Field of Classification Search .......... 428/317.9, 428/308.4; 521/83, 91
See application file for complete search history.

(56) References Cited

U.S. PATENT DOCUMENTS

| | | | |
|---|---|---|---|
| 3,497,409 A | 2/1970 | Clem |
| 4,739,007 A | 4/1988 | Okada et al. |
| 5,001,005 A | 3/1991 | Blanpied |
| 5,626,704 A | 5/1997 | Bowers, Jr. et al. |
| 5,643,998 A | 7/1997 | Nakano et al. |
| 5,660,428 A | 8/1997 | Catlin |
| 5,672,397 A | 9/1997 | Bowers, Jr. et al. |
| 5,688,866 A | 11/1997 | Silvis et al. |
| 5,693,710 A | 12/1997 | Srinivasan et al. |
| 5,712,003 A | 1/1998 | Suenaga et al. |
| 5,716,560 A | 2/1998 | Heuchert et al. |
| 5,717,000 A | 2/1998 | Karande et al. |
| 5,728,443 A | 3/1998 | Bowers, Jr. et al. |
| 5,733,644 A | 3/1998 | Tanaka et al. |
| 5,741,860 A | 4/1998 | Matsumoto et al. |
| 5,743,983 A | 4/1998 | Ogata et al. |
| 5,747,560 A | 5/1998 | Christiani et al. |
| 5,750,062 A | 5/1998 | Tsukamoto |
| 5,750,600 A | 5/1998 | Nozokido et al. |
| 5,883,173 A | 3/1999 | Elspass et al. |
| 6,872,432 B2 * | 3/2005 | Wilson ............... 428/36.4 |
| 2002/0190440 A1 * | 12/2002 | Wilson |

FOREIGN PATENT DOCUMENTS

| | | |
|---|---|---|
| CA | 2142764 | 8/1995 |
| EP | 0 352 042 B1 | 3/1995 |
| EP | 0 437 096 B1 | 9/1996 |
| EP | 0747323 A1 | 11/1996 |
| WO | WO 93/11190 | 6/1993 |
| WO | WO 94/22680 | 10/1994 |
| WO | WO 99/61236 | 12/1999 |
| WO | WO 99/61237 | 12/1999 |
| WO | WO 99/81281 | 12/1999 |

OTHER PUBLICATIONS

Porter et al. Journal of Polymer Science: Part B Polymer Physics—"Inorganic/Organic Host-Guest Materials: Surface and Interclay Reactions of Styrene with Cooper (II)—Exchanged Hectorite", vol. 36, 673-679, Mar. 1998.
Hasegawa et al. Journal of Applied Polymer Science—"Preparation and Mechanical Properties of Polypropylene-Clay Hybrids Using a Maleic Anhydride-Modified Polypropylene Oligomer"; vol. 67, 87-92, Jan. 3, 1998.
Ou et al. Journal of Polymer Science: Part B Polymer Physics—A New Conception on the Toughness of Nylon 6/Silica Nanocomposite Prepared via *In Situ* Polymerization; vol. 36, 789-795, Apr. 15, 1998.
Modern Plastics, "Nanocomposites showing promise in automotive and packaging roles", Feb. 1998, pp. 26-28.
Abstract—JP9316119A: "Olefin Polymerization of Catalyst and Polymerization of Olefin Using the Same".
Abstract—JP8027339A "Heat Resistant Vinyl Chloride Resin Composition".

(Continued)

*Primary Examiner*—Hai Vo
(74) *Attorney, Agent, or Firm*—Pillsbury Winthrop Shaw Pittman LLP

(57) ABSTRACT

A structural foam article suitable for molding into automobile trim, the article comprising at least one thermoplastic; about 2% to about 15% by volume reinforcing particles having one or more layers of 0.7 nm–1.2 nm thick platelets, wherein more than about 50% of the reinforcing particles are less than about 20 layers thick; at least one blowing agent present in a range from about 0.5% to about 10% by weight. A method of producing structural foam articles comprising this structural foam is also disclosed.

4 Claims, No Drawings

OTHER PUBLICATIONS

Abstract—JP8127089A: "Multilayered Plastic Fuel Tank".
Abstract—JP9048896A: "Vinyl Chloride-Based Resin Composition for Powder Molding".
Abstract—JP9048897A: "Vinyl Chloride-Based Resin Composition for Powder Molding".
Abstract—JP9067493A: "Chenille Under Door".
Abstract—JP9077943A: "Vinyl Chloride Resin Composition for Paste".
Abstract—JP9137019A: "Vinyl Chloride Resin Composition".
Abstract—JP 9302180A: "Vinyl Chloride Resin Composition for Powder Molding".
Abstract—JP 10060037A: "Catalyst for Polymering Olefin and Polymerization of Olefin in Presence of the Catalyst".
Abstract—JP 2029457A: "High-Rigidity and High-Impact Polyamide Resin Composition".
Abstract—JP2166157A: "Resin Composition".
Abstract—JP2208357A: "Material for Automotive Trim".
Abstract—JP2208358A: "Highly Rigid and Heat-Resistant Polyamide Resin Composition".
Abstract—JP2240160A: "Polyamide Blow Molding Material".
Abstract—JP3024155A: "Resin Composition".
Abstract—JP3215558A: "Resin Composition".
Abstract—JP3215557A: "Resin Composition".
Abstract—JP4180965A: "Preparation of Modified Composite Material".
Abstract—JP4305444A: "Foamed Sheet Material and Preparation Thereof".
Abstract—JP5293916A: "Multilayer Fuel Tube for Automobile".
Abstract—JP63132933A: "Thermotropic Liquid Crystal Copolyester".
Abstract—JP7324160A: "Polyphenylene Ether Resin Composition".
Clayton Chemistry, 1997, 5 pages.

* cited by examiner

STRUCTURAL FOAM COMPOSITE HAVING NANO-PARTICLE REINFORCEMENT AND METHOD OF MAKING THE SAME

CROSS-REFERENCE TO RELATED APPLICATIONS

This application is a continuation in part application of U.S. patent application Ser. No. 09/868,857 filed on Jun. 21, 2001, now abandoned entitled "Structural Foam Composite Having Nano-Particle Reinforcement And Method of Making The Same" which is incorporated herein by reference for all purposes.

GOVERNMENTAL SUPPORT AND INTEREST

The invention in this patent was made with Governmental support under Cooperative Agreement No. 70NANB7H3028 awarded to the Dow Chemical Company and Decoma International of America, Inc. (formerly Magna International of America, Inc.), project ID 199-02-0047B, project name "NANOCOMPOSITES—NEW LOW COST/HIGH STRENGTH MATERIALS FOR AUTOMOTIVE PARTS", awarded Sep. 30, 1997 by the United States Department of Commerce, National Institute of Standards and Technology, Advanced Technology Program. The Government has certain rights in this invention.

FIELD OF THE INVENTION

The present invention generally relates to the field of structural foam composites and more particularly to structural foam composites having nano-particle reinforcement.

BACKGROUND OF THE INVENTION

Foamed plastics are plastics having reduced apparent densities due to the presence of numerous cells disposed throughout the mass of the polymer. Rigid foams usually produced at greater than about 320 kg/m$^3$ density are known as structural foams, and are well known in the art. Structural foams are commonly used in various aspects of manufacturing molded articles in which low density polymer materials are desirable. Cellular polymers and plastics are made by a variety of methods having the basic steps of cell initiation, cell growth and cell stabilization. Structural foams having an integral skin cellular core and a high strength to weight ratio are made by several processes, including injection molding and extrusion molding, wherein a particular process is selected based upon product requirements.

Injection molding of structural foams is usually conducted under either low pressure or high pressure conditions. For example, during the injection molding process, a chemical blowing agent is typically introduced to the polymer resin melt in the extrusion barrel of an injection molding machine. The temperature of the extrusion barrel is increased under pressure, after which the pressure is released, injecting the polymer into a mold, permitting the chemical blowing agent to generate gas within the polymer. The expansion of the blowing agent pushes molten polymer material against the walls of the mold such that the material in contact with the walls has a higher density than the material toward the middle of the molded article. This establishes a density gradient wherein the outer surface areas of an injection molded article have a greater density than the core of the part due to more foaming in the center of the article. Thus, a gradient is established having smaller cells present near the mold surface with increasingly larger cells present toward the center of the article.

The use of blowing agents permits short shooting during the molding process. That is, because the blowing agent increases the volume of the expanding polymer composition, the mold is filled with less resin material than would be required without a blowing agent. Consequently, the density of the molded article may be reduced by about 10% to about 20% over articles molded without an incorporated blowing agent. Use of less polymer resin has the advantage of decreasing the weight of the final molded product.

Initiation of cell formation and promotion of cells of a given size are controlled by nucleation agents included in the polymer composition. The nature of cell-control agents added to the polymer compositions influence the mechanical stability of the foamed structure by changing the physical properties of the plastic phase and by creating discontinuities in the plastic phase which allows the blowing agent to diffuse from the cells to the surrounding material. Typically, the resulting cells provide for a lightweight molded article, but do so at the expense of impact resistance. For example, nucleation agents often promote crystalline structures within the cooled polymer, which reduce impact resistance. Mineral fillers may be added to provide a large number of nucleation sites, but such fillers tend to serve as stress concentrators, promoting crack formation and decreasing the impact resistance of molded articles.

Poor impact resistance of structural foam articles may be improved by the inclusion of glass fibers in the polymer melt during processing. However, glass fibers are generally too large to substantially reinforce the foam cells formed by the bubble structures. Glass fibers are often coated with sizing agents, which may induce clumping and impair even dispersion of the fibers. In addition, the amount of glass fibers required to achieve reasonable impact resistance of structural foam increases the specific gravity of polymer used therein, thereby increasing the density of the foamed article. This defeats the purpose of using lightweight foamed articles in the manufacture of, for example, automobiles, where lightweight components are highly desirable. Consequently, the levels of glass fibers in polymer compositions for foamed articles are kept relatively low, meaning impact resistance of the molded products is poor.

Typically, the reduced strength of structural foams may be at least partially offset by increasing the wall thickness of molded articles. Increasing wall thickness requires more raw materials per unit molded, thereby increasing the cost of production.

U.S. Pat. No. 5,753,717 to Sanyasi discloses a method of producing foamed plastics with enhanced physical strength. The structural foams of Sanyasi utilize $CO_2$ in combination with an adjustment in the extrusion temperature of molten polystyrene resins to improve foam strength. This process, however, does not improve the foam strength of other types of resins, and is not suitable for enhancing the strength of articles for use in, for example, automotive trim.

Structural foam automotive parts historically have inconsistent surface appearances due to variations in the density of the polymer near the skin or surface of these molded articles. The imperfections in the surfaces of molded structural foam articles usually limits the usage of these foam products to non-appearance (e.g., hidden or non-visible) parts or parts in which the surface has been textured. Examples of these structural automotive interior trim products include interior door panel structural members, instrument panel retainers, interior seat backs covered with fabric, load floors in the storage compartments of vehicles, side wall trim and the like. Some pickup truck beds can be made from structural foam. All of these products require reduced density and good impact resistance.

SUMMARY OF THE INVENTION

An object of the present invention is to overcome the problems delineated hereinabove. In accordance with this object, the present invention provides a structural foam article suitable for use as automobile trim. The article (and hence the composition forming the article) comprises at least one thermoplastic; about 2% to about 15% by volume reinforcing particles having one or more layers of 0.7 nm–1.2 nm thick platelets, wherein more than about 50% of the reinforcing particles are less than about 20 layers thick, and wherein more than about 99% of the reinforcing particles are less than about 30 layers thick; and there is at least one blowing agent present in a range from about 0.5% to about 10% by weight. The automotive trim component is constructed and arranged to be both lightweight and strong, exhibiting good impact resistance.

It is a further object of the present invention to provide a method which overcomes the problems delineated above. Accordingly, there is provided a method of producing structural foam articles which comprises preparing a melt of at least one thermoplastic having about 2% to about 15% by volume reinforcing particles. The reinforcing particles have one or more layers of 0.7 nm–1.2 nm thick platelets, wherein more than about 50% of the reinforcing particles are less than about 20 layers thick. More than about 99% of the reinforcing particles are less than about 30 layers thick. The melt comprises at least one blowing agent present in a range from about 0.5% to about 10% by weight. The polymer melt is subjected to a molding process, wherein the molding process is a process selected from the group consisting of injection molding and extrusion molding.

In accordance with an aspect of the invention, there is provided, a structural foam article comprising at least one thermoplastic; about 2% to about 15% by volume reinforcing particles, each of said reinforcing particles having one or more layers of 0.7 nm–1.2 nm thick platelets, wherein more than about 50% of the reinforcing particles are less than about 20 layers thick, wherein more than about 99% of the reinforcing particles are less than about 30 layers thick, and wherein at least some of the reinforcing particles are larger than about 10 layers thick; and at least one blowing agent present in a range from about 0.5% to about 10% by weight.

In accordance with another aspect of the invention, at least 80% of the reinforcing particles have an aspect ratio of about 50 to about 300.

In accordance with yet another aspect of the invention up to about 50% of the reinforcing particles are larger than about 10 layers in thickness.

In accordance with a further aspect of the invention, the structural foam article comprises about 5% of reinforcing particles by volume for increasing a flexural modulus of the structural foam. This increases the flexural modulus by at least three times in comparison to a structural foam absent any reinforcing particles.

In accordance with another aspect of the invention, there is provided, a structural foam article comprising at least one thermoplastic, about 2% to about 15% by volume reinforcing particles, each of said reinforcing particles having one or more layers of 0.7 nm–1.2 nm thick platelets, wherein more than about 50% of the reinforcing particles are less than about 20 layers thick, wherein more than about 99% of the reinforcing particles are less than about 30 layers thick, and wherein up to about 50% of the reinforcing particles are larger than about 10 layers thick, and at least one blowing agent present in a range from about 0.5% to about 10% by weight.

In accordance with yet a further aspect of the invention there is provided, a method of producing structural foam articles comprising: preparing a melt of at least one thermoplastic having about 2% to about 15% by volume reinforcing particles having one or more layers of 0.7 nm–1.2 nm thick platelets, wherein more than about 50% of the reinforcing particles are less than about 20 layers thick, wherein more than about 99% of the reinforcing particles are less than about 30 layers thick, and wherein at least some of the reinforcing particles are larger than about 10 layers thick, and said melt comprising at least one blowing agent present in a range from about 0.5% to about 10% by weight; and subjecting the polymer melt to a molding process, wherein the molding process is a process selected from the group consisting of injection molding and extrusion molding.

This and other objects of the invention can be more fully appreciated from the following detailed description of the preferred embodiments.

DETAILED DESCRIPTION OF THE PREFERRED EMBODIMENTS

In accordance with the present invention, reinforcing nanoparticle fillers are added in levels of only a few percent by volume to polymer compositions prior to molding into the article. As a result, the impact resistance of molded articles made of, for example, polyolefins, is improved. For example, automobile splash guards and fender liners may utilize greater amounts of recycled polypropylene when combined with reinforcing nanoparticles to create strong molded parts, thereby requiring less higher cost virgin polymers and using as much as 30% less material overall due to improved strength. Use of lower cost, reinforced materials for the interior trim of an automobile is an effective way to provide impact resistant components without negatively affecting the production cost per automobile.

The automotive parts manufactured in accordance with the present invention comprise a composite material of a polymer having dispersed therein reinforcement fillers in the form of very small mineral reinforcement particles. The reinforcement filler particles, also referred to as "nanoparticles" due to the magnitude of their dimensions, each comprise one or more essentially flat platelets. Generally, each platelet has a thickness of between about 0.7–1.2 nanometers. The average platelet thickness is approximately 1 nanometer.

The preferred aspect ratio, which is the largest dimension divided by the thickness of each particle, is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably at least 90% of the particles have an aspect ratio within the 100–200 range.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadite, and kenyaite. Mixed Mg and Al hydroxides may also be used. Various other clays can be used, such as claytone H.Y. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The polymer composites of the present invention are prepared by combining the platelet mineral with the desired polymer in the desired ratios. The components can be blended by general techniques known to those skilled in the art. Nanocomposites have been formed using a variety of shear devices. For example, the components can be physically blended and then melted in mixers, ultrasonicators, or extruders, such as twin screw extruders. Twin screw extrusion has been proven to be the most effective for the exfoliation and dispersion of silicate layers.

There are two basic approaches to achieve an exfoliation of stacked layered particles. One approach is to use a relatively high mechanical energy as discussed heretofore, and another approach is to use a compatibilizer chemistry. The use of a compatibilizer chemistry yields a good exfoliation of the stacked layered mineral particles. However, one disadvantage with the use of a compatibilizer chemistry is that residues from the compatibilizer chemistry can attach to the platelet particles and the polymer and act as impurities in the finished nanocomposite. These impurities can interfere with the mechanical properties of the nanocomposites.

Using mechanical energy to exfoliate the stacked layered mineral particles, it is relatively easy to obtain particles that are 30 layers thick. In order to peel the layers further apart, it is necessary to apply a relatively high mechanical energy for longer residence time in the extruder. This significantly decreases the production rate in ponds per hour.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284.

U.S. Pat. No. 5,717,000 to Karande et al. relates to polymer foams prepared from resins having dispersed therein delaminated or exfoliated organophilic multi-layered particles. The polymer foam taught by Karande et al. can be prepared by the steps of dispersing the organophilic multi-layered particles into a melt comprising an olefinic or styrenic polymer having polar functionality so that at least a portion of the polymer intercalates between layers of the particles.

U.S. Pat. No. 5,747,560 to Christiani et al. relates to a process for forming a composite material comprising a polymer matrix having dispersed therein platelet particles, derived from swellable intercalated layered material, and to a composite material formed by this process. Christiani et al. teach that delamination is important for their invention to work. They expressly disclose that the particles have to be less than about 10 layers thick and preferably less than 5 layers thick in order to achieve enhanced properties with these nanodispersed fillers over conventional micro-scale fillers. Christiani et al. teach that in cases where intercalation is incomplete between some layers, those layers will not delaminate in the polymer melt, and will form platelet particles comprising those layers in a coplanar aggregate. However, Christiani et al. teach that those platelet particles can only constitute nano-scale and nano-dispersed fillers and provide enhanced properties over and above those provided by conventional micro-scale if they are less than about 10 layers thick. Christiani et al. provide a detailed description on how to further facilitate delamination of layered materials into platelet particles and to prevent reaggregation of the particles by intercalation with swelling/compatibilizing agents. Christiani et al. state that compatibilization will lead to an improved dispersion of the platelet particles in the matrix and an improved percentage of delaminated platelets with a thickness of less than 50 Å.

U.S. Pat. No. 4,739,007 to Okada et al. discloses a composite material with high mechanical strength and excellent high-temperature characteristics comprising a polymer matrix containing polyamide and layers of a silicate uniformly dispersed in the order of molecules in the polymer matrix, each of the silicate layers of the dispersed silicate being 7 to 12 Angstroms (0.7 to 1.2 nm) thick and the interlayer distance of the silicate layers in the dispersed silicate being at least 20 Angstroms (2 nm). Okada et al. further state that the silicate layers are finely dispersed in the order of magnitude of molecular dimensions (in a thickness of 10 Angstroms (1 nm) or so) and are firmly combined with the chains of organic molecules. A thickness of about 10 Angstroms or 1 nm of the phyllosilicate in Okada et al. corresponds to about one layer of the phyllosilicate. Okada et al. clearly teaches that the silicate layers are uniformly dispersed. This means that the silicate layers are dispersed into the individual single clay layers having a thickness of about 1 nm. In an exfoliated structure, the layers of the silicate or clay mineral are completely separated and the individual layers are distributed throughout the polymeric matrix.

The naturally occurring geometry of layered silicates or clay particles is a stacked geometry of individual platelets. It is generally accepted in the prior art that the preparation of nanocomposites requires extensive delamination of the layered clay structure and complete dispersion of the resulting platelets throughout the polymer matrix. Thus, in accordance with the prior art, an exfoliated nanocomposite, wherein the layered mineral swells so much that it is no longer organized into stacks, is the most desirable structure. Therefore, the prior art discloses methods to improve exfoliation to achieve complete or almost complete exfoliation. However, usually very strong electrostatic interactions between silicate layers through intergallery cations make it extremely difficult to achieve complete exfoliation of the layers. Thus, the prior art discloses efforts to avoid this difficulty and to achieve complete or nearly complete exfoliation of the particles through the development of a compatibilizer chemistry as a key factor in the expansion of this nanotechnology, for example, by replacing such cations by some quaternized ammonium salts.

Generally, expandable plastic formulations include polystyrenes, poly(vinyl chlorides), polyethylene, polyurethanes, polyphenols and polyisocyanates. A preferred thermoplastic is used, and based on the selection of thermoplastic determines the temperature at which foaming commences, the type of blowing agent used and the cooling conditions required for dimensional stabilization of the foam. Preferably, the thermoplastic used in the present invention is a polyolefin or a homogenous or copolymer blend of polyolefins. The preferred polyolefin is at least one member selected from the group consisting of polypropylene, ethylene-propylene copolymers, thermoplastic olefins (TPOs), and thermoplastic polyolefin elastomers (TPEs). For high performance applications, engineering thermoplastics are most preferred type of thermoplastic. Such engineering thermoplastic resins may include polycarbonate (PC), acrylonitrile butadiene styrene (ABS), a PC/ABS blend, polyethylene terephthalates (PET), polybutylene terephthalates (PBT), polyphenylene oxide (PPO), or the like.

The exfoliation of layered mineral particles into constituent layers need not be complete in order to achieve the objects of the present invention. The present invention contemplates that at least 99% of the particles should be less than about 30 nanometers (30 layers or platelets) in thickness, and that more than about 50% of the particles should be less than about 20 nanometers (20 layers or platelets) in the thickness direction. Preferably, at least 90% of the particles should have a thickness of less than 5 layers. Also, it is preferable for at least 70% of the particles should have a thickness of less than 5 nanometers. It is most preferable to have as many particles as possible to be as small as possible, ideally including only a single platelet. Particles having more than 30 layers behave as stress concentrators and should be avoided, to the extent possible.

As was discussed heretofore, in the state of the art it is believed that complete or nearly complete exfoliation is a key factor in achieving nanocomposites with enhanced properties. However, in accordance with the present invention, the exfoliation (delamination and dispersion) of the layered mineral particles into constituent layers does not need to be as complete. For example, in accordance with the present invention it was found that at least some of the particles can be up to 30 layers thick to still yield nanocomposites showing enhanced mechanical properties. The particles disclosed by U.S. Pat. Nos. 5,717,000 and 4,739,007 are a relatively finer fraction of layered mineral particles, viz. single layer delaminated or exfoliated particles and uniformly dispersed individual or single clay layers having a thickness of about 1 nm, respectively. U.S. Pat. No. 5,747,560 requires that the reinforcing particles are exfoliated and not more than up to about 10 layers thick in order to be used as nanoscale and nanodispersed fillers and to provide enhanced properties over and above those provided by conventional micro-scale fillers. In accordance with the instant invention, at least some of the reinforcing particles are larger than about 10 layers thick and up to about 30 layers thick. However, at least 99% of the particles should be less than about 30 layers in thickness and more than about 50% of the particles should be less than about 20 layers in thickness. Consistent with this greater tolerance for relatively larger particles in accordance with the present invention, an identifiable amount of reinforcing particles are from about 11 to about 30 layers thick. Advantageously, this greater tolerance for relatively larger particles reduces the efforts in achieving an exfoliation of the layered mineral particles and hence it reduces the time and cost of providing reinforcing particles in accordance with the present invention. The exfoliation process can be conducted in different specific ways to achieve different degrees of exfoliation with different particle thickness ranges. For example, as was discussed hereinabove, a twin screw extrusion process can be used to provide reinforcing particles in accordance with the specifications of the present invention. The nanocomposites obtained by this process are physically blended nanocomposites. In comparison to reinforcing particles having a layer thickness of about 10 layers or less, less mechanical energy is needed to provide reinforcing particles of about 30 layers in thickness. Hence, in accordance with the instant invention having a greater tolerance for relatively larger particles than the prior art, i.e. an identifiable amount of reinforcing particles is larger than about 10 layers in thickness, time and energy savings are obtained. Thus in accordance with the instant invention, a substantial amount, of reinforcing particles is larger than 10 layers, relative to the prior art. For example, in accordance with an embodiment of the instant invention, up to about 50% of the reinforcing particles can be larger than about 10 layers in thickness.

Furthermore, the use of mechanical energy in accordance with the instant invention to exfoliate the mineral particles and to provide a physical blend of the reinforcing particles and a polymer is more cost effective than the use of a compatibilizer chemistry. Another advantage obtained in accordance with the present invention is that the exfoliation of the layered mineral particles in accordance with the present invention using mechanical energy, provides structural foam articles with better mechanical properties as in comparison to structural foam articles containing reinforcing particles obtained by an exfoliation process using compatibilizer chemistry. For example, it was found that the presence of 5% nanoparticles by volume in a structural foam, wherein the nanoparticles are obtained by exfoliation using mechanical energy, can increase a flexural modulus of the structural foam by at least 3 to 3.5 times. In contrast, it was found that the presence of 5% nanoparticles by volume in a structural foam, wherein the nanoparticles are obtained by exfoliation using compatibilizer chemistry, can increase a flexural modulus of the structural foam only by about two times.

Generally, in accordance with the present invention, each of the automotive parts that can be manufactured in accordance with the principles of the present invention should contain nanoparticle reinforcement in amounts less than 15% by volume of the total volume of the part. The balance of the part is to comprise an appropriate thermoplastic material, a blowing agent and optionally, suitable additives. If greater than 15% by volume of reinforcement filler is used, the viscosity of the composition becomes too high and thus difficult to mold. Preferably, the amount of reinforcing nanoparticles is greater than 2% by volume (as lower amounts would not achieve the desired increase in strength) and less than 15%. More preferably, the nanoparticles comprise less than 13% and greater than 3% of the total volume of the part for extrusion molding.

Preferably, relatively rigid injection molded trim parts comprise reinforcement particles of the type described herein at about 2–10% of the total volume of the part, with the balance comprising the thermoplastic substrate. It is even more preferable for these interior panels to have reinforcement particles of the type contemplated herein comprising about 3%–8% of the total volume of the part. For some applications, inclusion of about 3%–5% reinforcing nanoparticles is optimal. Inclusion of more than 10% nanoparticles tends to increase the viscosity of the composition to point which impairs injection molding.

Blowing agents incorporated into the compositions according to the invention govern the amount of gas generated during polymer processing and molding, and thus control the density of the final product. The type of agent used determines the rate of gas production, the pressure developed during gas expansion, and the relative amount of gas lost from the system to the amount of gas retained within the cells. Blowing agents may be either physical or chemical agents; chemical agents are preferred. Chemical agents may be organic or inorganic compounds. Commonly used inorganic blowing agents include $CO_2$, nitrogen, helium, argon and air. Organic agents include volatile organics and halogenated hydrocarbons, such as chlorofluorocarbons, and hydrochlorofluorocarbons, although their use is diminishing due to environmental concerns. Volatile organic compounds include aliphatic hydrocarbons, such as propane, n-butane, neopentane, hexane, and the like. Preferred blowing agents are azo compounds which produce $CO_2$ and $O_2$ in the presence of heat. Preferably, at least one blowing agent is present in the polymer composition (and hence the molded article) in a range from about 0.5% to about 10%, more preferably about 0.5% to about 4% by weight. Combinations of more than one blowing agent may be used.

Additives or cell control agents heavily influence the nucleation of foam cells by altering surface tension of the polymer system or by serving as nucleation sites from which cells can grow. Nucleation agents are often added to polymer compositions to promoting bubble formation during processing of polypropylenes. Nucleation agents can be selected to develop cells of a particular pore size. Suitable nucleating agents include metal aromatic carboxylates, sorbitol derivatives, inorganic compounds and organic phosphates. Examples are aluminum hydroxyl di-p-t-butyl benzoate, dibenzylidene sorbitol, magnesium silicate (talc), sodium 2,2'-methylene bis (4,6-di-t-butylpheyl) phosphate and zinc oxide. Inorganic nucleation agents are often chemically modified to improve dispersion throughout the polymer composition. The chosen nucleation agent will influence the mechanical properties of the polymer composition, and should be selected accordingly. For example, some fillers induce crystallization of polymers, which impairs impact resistance of molded articles.

The nanoparticles of the invention also advantageously behave as nucleating agents in polymer compositions. The extremely small size of these reinforcing particles permits them to be evenly dispersed throughout the polymer composition. Accordingly, the extremely small size and even distribution of the nanoparticles provides for between about 20 to about 100 times more potential nucleation sites within the polymer composition than can be achieved in an equivalent volume using larger, standard nucleation agents.

Specifically, for each 1% loading of nanoparticles by volume, there exists a minimum of at least about $10^{11}$ particles, and hence potential nucleation sights (one for each particle), per cubic centimeter of structural foam, where more than 50% of the reinforcement particles are less than about 20 platelets thick, and wherein the majority of reinforcement particles have a total particle size of less than about 20 nm×200 nm×300 nm. Where the majority (>50%) of particles are one platelet thick and have an approximate total particle size of about 1.2 nm×50 nm×75 nm or less, the potential nucleation sites increases to at least about $10^{14}$ per 1% loading of reinforcement particles. Where the majority (>50%) particles are one platelet thick and have an approximate total particle size of about 1.2 nm×200 nm×300 nm or less, the potential nucleation sites is about $2\times10^{12}$ per 1% loading of reinforcement particles. In the broad aspect of the invention, it is contemplated that there exists at least $10^{11}$ particles for each 1% loading of nanoparticles per cubic centimeter of structural foam, with the balance of the cubic centimeter being formed from the other constituent components of structural foam, such as thermoplastic material, blowing agent, and optionally, at least one additive.

When about 90% of the nanoparticles in the composition are less than 5 nm in thickness, a more preferred uniform distribution of the particles occurs in the resin, which translates into evenly distributed gas bubble formation during blow molding. A reduction to near elimination of clusters of nucleation agent can be achieved, accordingly. The advantage to nanoparticle nucleation is the near elimination of nucleation stress concentrators in concert with substantial reinforcement of foam cells, which is not possible with existing nucleation agents.

In addition to nucleating agents, other additives may optionally be included in the polymer composition to improve processability. For example, aging modifiers, such as glycerol monostearate, are useful additives in polymer compositions for molding. Aging modifiers are typically present in an amount from about 0.5% to about 5% polyolefin resin. Lubricants may also be present to enhance extrusion of the polymer composition during molding. Other additives include pigments, heat stabilizers, antioxidants, flame retardants, ultraviolet absorbing agents and the like.

Reinforced articles of the invention exhibit improved properties over non-reinforced articles. For example, polyethylene articles having 5% nanoparticles by volume, wherein 90% of the particles have 5 or fewer layers, increased flexural modulus by 2.5 to about 3 times over compositions lacking reinforcing nanoparticles, as measured under ASTM D790 test conditions. This 5% nanoparticle polyethylene composition exhibited >200% elongation to rupture. By contrast, about 25% glass fiber reinforcement is required in such articles to achieve an equivalent modulus. Polypropylene articles according to the invention showed about a 60% improvement in flexural modulus over articles lacking reinforcement nanoparticles. Thus, the use of reinforcing nanoparticles according to the invention provides articles having good flexural stiffness.

The specific gravity of structural foams having reinforcing nanoparticles is typically 22.5% lower than in materials lacking a blowing agent, which is 50% less dense than the blow molded foams known in the art.

It should be appreciated that the foregoing description is illustrative in nature and that the present invention includes modifications, changes, and equivalents thereof, without departure from the scope of the invention.

What is claimed is:

1. A structural foam article comprising:
    (a) at least one thermoplastic;
    (b) about 2% to about 15% by volume reinforcing particles, each of said reinforcing particles having one or more layers of 0.7 nm–1.2 nm thick platelets, wherein more than about 50% of the reinforcing particles are less than about 20 layers thick, wherein more than about 99% of the reinforcing particles are less than about 30 layers thick, and wherein at least some of the reinforcing particles that are not completely exfoliated are from about 15 to about 30 layers thick; and
    (c) at least one blowing agent present in a range from about 0.5% to about 10% by weight.

2. The structural foam article as defined in claim 1 wherein at least 80% of the reinforcing particles have an aspect ratio of about 50 to about 300.

3. The structural foam article as defined in claim 1 comprising about 5% of reinforcing particles by volume for increasing a flexural modulus of the structural foam.

4. The structural foam article as defined in claim 3 wherein the flexural modulus is increased by at least three times in comparison to a structural foam absent any reinforcing particles.

* * * * *